United States Patent Office 3,515,512
Patented June 2, 1970

1

3,515,512
COMPLEX SULFITES OF COPPER AND IRON AND THE METHOD OF PREPARING THEM
Roald R. Skarbo, Lexington, Mass., assignor to Kennecott Copper Corporation, New York, N.Y., a corporation of New York
No Drawing. Filed Jan. 5, 1968, Ser. No. 695,864
Int. Cl. C01g 1/14
U.S. Cl. 23—129   12 Claims

ABSTRACT OF THE DISCLOSURE

Complex sulfites containing copper, iron, and a metal selected from the metals of Groups Ia, IIa, VIIb and VIII other than iron of the Periodic Table, and the process for making the complex sulfites are claimed.

The new complex sulfites from iron and copper of this invention may, in general, be represented by the formula (Cu-Fe-Me)$SO_3$, where Me represents a metal selected from the metals of groups Ia, IIa, VIIb, and VIII, other than iron, of the Periodic Table with reference to the Periodic Table shown on p. 1680 of Webster's Third New International Dictionary, Unabridged (1961). These compounds have been shown to have utility in recovering metals from dilute solutions containing them, as fungicides, germicides, and where Me is manganese the complex sulfites have value as soil nutrients.

The complex sulfites are novel reaction products between:

(1) A solution containing copper ions, iron ions and ions of a metal selected from the metals of Groups Ia, IIa, VIIb and VIII other than iron, and (2) The sulfite ion.

The complex sulfites of this invention may be prepared by three different methods.

(A) Sulfur dioxide gas is bubbled into an aqueous solution containing copper and iron ions until a sufficient quantity of sulfur dioxide has been added. The solution is then neutralized with a carbonate or a hydroxide of the third metal to allow the complex sulfite to precipitate out.

(B) To a solution containing ions of copper, iron and a third metal (Me) is added at least a quantitative amount of sulfur dioxide gas. The solution is then neutralized with a carbonate of the third metal to allow the (Cu-Fe-Me) sulfite complex to precipitate out of solution. However, in the preparation of the (Cu-Fe-Mn) sulfite any metal carbonates selected from sodium, potassium, magnesium, calcium, cobalt and nickel carbonate may be used since the (Cu-Fe-Mn) sulfite is substantially less soluble than the other (Cu-Fe-Me) sulfites. In other words, in a solution containing copper, iron and manganese ions along with ions of other aforementioned metals, the (Cu-Fe-Mn) sulfite will precipitate out in preference to the other complex sulfites.

(C.) The third metal ion (Me) and the sulfite ion may be supplied to a copper-iron ion containing solution by a compound or a solution of a compound selected from $Na_2SO_3$, $NaHSO_3$, $K_2SO_3$, $KHSO_3$, $CaSO_3 \cdot 2H_2O$, $Ca(HSO_3)_2$, $MgSO_3 \cdot 5H_2O$, $CoSO_3 \cdot 5H_2O$ and $NiSO_3 \cdot 6H_2O$ In all three cases, A, B and C, the complex copper-iron-metal sulfite is precipitated out and recovered by filtra-

2 tion. It is preferred to carry out the process of this invention at normal ambient temperatures since the complex sulfites will precipitate out without the addition of heat.

Previously suggested methods for recovering copper from dilute solution by chemical precipitation include the precipitation of copper as a sulfide, as a cyanide, as a thiocyanate, and as a hydroxide using lime as a precipitant. These methods have gained little commercial interest, mainly because of high reagent costs and difficulties in the settling and filtration of the precipitates.

Another aspect of this invention is a method of recovering copper by the precipitation of copper as a crystalline complex sulfite material containing copper, iron and one other metal. The complex sulfite precipitate has a fast settling and filtration rate, thus greatly reducing the separation problems. It is also important that the solution is almost completely depleted of the metal values after precipitation.

It is a particular advantage of this invention that the complex copper-iron-metal sulfites can be recovered from solution containing minute quantities of the copper in the solution. There are several sources of dilute aqueous solutions that can be used for making the new sulfite compounds of this invention. For example, leach solutions from copper mining operations may be used. In open pit copper mining operations it is necessary to remove large quantities of waste material to obtain the desired ore. This waste material is a low grade ore generally containing small amounts of copper and other metal values that cannot be economically recovered by conventional or classic methods. The waste material is generally deposited in a waste dump and a leaching agent, an aqueous solution of sulfuric acid, is allowed to pass through the low grade ore reacting with the metals therein forming water soluble compounds. Generally, depending on the character of the ore, the leach solutions will contain from about 1.5 to 2.5 gm. per liter copper, from about 2 to 10 gm. per liter iron and other mineral values such as manganese, cobalt, nickel, magnesium, aluminum, etc. The leach solutions are collected and treated by the process of this invention to precipitate out the metal values.

The metal values may be recovered from the copper-iron-metal sulfite complexes by any known method. For example, the sulfite material can be mixed with gypsum, coke and silicon dioxide, and smelted in a blast furnace to produce a copper matte. The matte is then fed to a converter and treated in the conventional manner to recover pure copper metal. As another example, the metal values can be recovered from the copper-iron-manganese sulfite by treating the sulfite in an aerated solution of ammonia, thereby dissolving the copper and leaving the iron and manganese behind as insoluble iron hydroxide and manganese dioxide. The copper is then recovered from the ammoniacal solution, for example, by direct gas reduction with hydrogen.

A second source of solutions containing copper and iron results from the leaching of sea nodules. The sea nodules are mined from the ocean floors to recover the mineral values therefrom. The sea nodules contain significant quantities of manganese, iron, copper, cobalt and nickel. For example sea nodules may contain from about 20 to 25 weight percent manganese, 5 to 10 weight percent iron, about 0.5 to 1.5 weight percent copper and recoverable amounts of cobalt and nickel. The sea nodules are crushed and suspended in water. Sulfur dioxide is then bubbled through the suspension to leach out the mineral values. The pH of the leach solution is then raised to precipitate the (Cu-Fe-Mn) sulfite complex. This may be accomplished by removing the excess sulfur dioxide from the solution or by the addition of a neutralizing agent.

A third source of a solution containing copper and iron to prepare the complex sulfites of this invention may be made from the respective copper and iron sulfates. The metal sulfates need not be in the pure form. Thus metal sulfates such as obtained from pickling and metal cleaning processes may be used. The copper and iron sulfates are dissolved in water and the pH of the solution adjusted to less than 3 in order to avoid hydrolysis of the iron in solution. Another metal sulfate, such as manganese, magnesium, cobalt, nickel, sodium etc. may also be added to the solution. Sulfur dioxide is then bubbled through the sulfate solution for a period of time sufficient to insure complete reaction. After the sulphur dioxide treatment the acidic solution is neutralized in order to precipitate out the desired complex sulfite. It should be noted that in some cases it is not necessary to bubble $SO_2$ through the solution. Sodium sulfite may be used in supplying the sulfite ion in preparing the complex sulfites. In another mode of preparing the complex sulfites a water soluble sulfite having the general formula $Me_x(SO_3)_y$ may be added to an aqueous solution containing copper and iron ions.

Since it is not necessary to use a purified form of sulfur dioxide gas in the process of this invention gases containing $SO_2$ may be used. Such gases, for example, may be obtained when pyrite is roasted. Sulfur dioxide is also present in smelter stack gases and the stack gases may be used without purification. Of course, the $SO_2$ used in the process of this invention may be obtained by the direct burning of sulfur.

The neutralizing agents that can be used within the scope of this invention include the inorganic carbonates and hydroxides. Specific examples include sodium carbonate, potassium carbonate, calcium carbonate, and other metal carbonates selected from the carbonates of the metals of Groups Ia, IIa, VIIb and VIII other than iron. Mixtures of the above noted carbonates may also be used for neutralizing the solutions. In some instances partial neutralization is accomplished with a carbonate and then complete neutralization is accomplished with a hydroxide.

In one of the preferred embodiments of this invention a copper-iron-manganese sulfite complex is formed. A solution containing from about 2 to 15 grams of copper per liter, from about 5 to 30 grams of iron per liter and from about 4 to 40 grams of manganese per liter is provided. Sulfur dioxide is then bubbled through the solution. Generally from about 2 to 4 times the amount of sulfur dioxide required to react with the copper is used to insure a complete reaction. The pH of the solution will then be in the range of from about 1 to 2. The solution is then neutralized. The preferred neutralizing agent is sodium carbonate. However, any of the neutralizing agents mentioned above may be used. A quantity of neutralizing agent is used that will raise the pH of the solution to at least 2.7 and preferably no higher than about 5. The complex (Cu-Fe-Mn) sulfite precipitates out as a crystalline material.

Complex sulfites specifically claimed herein include (Cu-Fe-Mn) sulfite, (Cu-Fe-Na) sulfite, (Cu-Fe-K) sulfite, (Cu-Fe-Ca) sulfite, (Cu-Fe-Co) sulfite, (Cu-Fe-Ni) sulfite, and (Cu-Fe-Mg) sulfite. These sulfite complexes may be represented by the formula $(Cu-Fe-Me)SO_3$ where Me is selected from sodium, potassium, magnesium, calcium, manganese, cobalt and nickel.

Because of the inextricable chemical or ionic bonding states of the elements in the complex sulfites it has not been possible to unambiguously assign valence states to the copper and iron in the complex. Therefore it has not been possible to assign definite molecular formulas to these complex compounds. The weight ratio ranges hereinafter referred to relate to the Cu:Me range and the Fe:Me range as independent quantities. The Cu:Fe range is dependent upon the Cu:Me and Fe:Me range. The (Cu-Fe-Me) sulfites will have, in general, a Cu:Fe:Me weight ratio in the range from about 0.6:0.7:1 to about 4:6:1. In the preferred copper-iron-manganese sulfite the Cu:Fe:Mn ratio is from about 0.6:0.7:1 to 1.3:2:1. In the copper-iron sodium and magnesium sulfites the Cu:Fe:Na and Cu:Fe:Mg weight ratio is from about 2:3:1 to 4:6:1. In the copper-iron nickel and cobalt sulfites the Cu:Fe:Ni and Cu:Fe:Co weight ratio is from about 1:4:1 to 3:6:1. In the copper-iron potassium and calcium sulfites the Cu:Fe:K and Cu:Fe:Ca weight ratio is from about 0.6:0.7:1 to 1.5:2:1.

The following examples will demonstrate the preferred methods of making the complex sulfites. However these examples are for illustrative purposes and are not to be considered as limiting the invention except as defined in the appended claims.

EXAMPLES 1–14

Examples 1–14 illustrate the preparation of copper-iron-manganese sulfites from solutions containing varying amounts of metal values. The results are shown in Table I. The procedure followed to prepare the complex sulfites of Examples 1–14 were as follows:

(a) Solution containing the copper, iron and manganese concentrations indicated in Table I were prepared from copper, iron and manganese sulfates.
(b) The metal sulfate solutions at room temperature were saturated with sulfur dioxide gas to give a solution with a pH of approximately 1.
(c) The pH of the solutions were then raised by the addition of sodium carbonate until the desired pH was obtained.
(d) The solutions were allowed to stand to allow the complex sulfite to precipitate.
(e) The complex sulfites formed were removed from the solutions by filtration, washed with distilled water and air dried.

The complex sulfite precipitates were easily filtered, were granular in nature and were red-brown in color.

TABLE I.—COPPER-IRON-MANGANESE SULFITES

| Example No. | Solution concentration | | | Highest pH value during precipitation | Chemical analysis-weight percent | | | | Cu:Fe:Mn wt. ratio |
|---|---|---|---|---|---|---|---|---|---|
| | Gm./l. $Cu^{2+}$ | Gm./l. $Fe^{2+}$ | Gm./l. $Mn^{2+}$ | | Copper | Iron | Manganese | Sulfur | |
| 1 | 6 | 10 | 8 | 3.0 | 9.40 | 12.6 | 9.85 | 15.73 | 0.95:1.28:1 |
| 2 | 6 | 10 | 8 | 3.25 | 9.31 | 12.7 | 10.00 | 15.81 | 0.93:1.27:1 |
| 3 | 6 | 10 | 8 | 3.50 | 9.12 | 12.3 | 9.97 | 15.79 | 0.92:1.23:1 |
| 4 | 6 | 20 | 8 | 3.0 | 9.06 | 14.6 | 7.70 | 15.90 | 1.18:1.90:1 |
| 5 | 6 | 20 | 8 | 3.25 | 9.05 | 14.7 | 7.53 | 15.84 | 1.20:1.96:1 |
| 6 | 6 | 20 | 8 | 3.5 | 8.99 | 14.8 | 7.56 | 15.98 | 1.19:1.96:1 |
| 7 | 10 | 25 | 20 | | 8.57 | 13.3 | 9.63 | 15.30 | 0.89:1.38:1 |
| 8 | 10 | 25 | 20 | | 8.41 | 13.2 | 9.68 | 15.20 | 0.87:1.36:1 |
| 9 | 10 | 25 | 20 | | 10.20 | 12.5 | 9.42 | 15.58 | 1.08:1.33:1 |
| 10 | 10 | 25 | 20 | | 8.57 | 11.9 | 9.02 | 15.3 | 0.95:1.32:1 |
| 11 | 10 | 25 | 40 | | 8.37 | 10.5 | 11.10 | 16.65 | 0.75:0.95:1 |
| 12 | 10 | 25 | 40 | | 11.70 | 9.5 | 11.00 | 15.03 | 1.06:0.86:1 |
| 13 | 4.4 | 8 | 22 | | 8.53 | 8.9 | 12.10 | | 0.70:0.74:1 |
| 14 | 4.4 | 8 | 22 | | 8.78 | 9.2 | 11.70 | | 0.75:0.79:1 |

EXAMPLES 15-24

Examples 15-24 illustrate copper-iron-sodium sulfites, copper-iron-potassium sulfites, copper-iron-magnesium sulfites, copper-iron-nickel sulfites and copper-iron-cobalt sulfites. The same general procedure as described for Examples 1-14 was used except for Example 23. In Example 23 instead of bubbling $SO_2$ gas through the solution the sulfite was supplied by adding solid sodium sulfite to the copper-iron containing solution.

Table II shows a tabulation of the results obtained in Examples 15-24.

EXAMPLE 27

This example illustrates the preparation of complex sulfites from a solution typical of that resulting from the leaching of copper-bearing waste materials.

The sulfate solution contained about 2.01 gm. copper and 6 gm. iron per liter and had a pH value of about 2.5. Sulfur dioxide was bubbled through the solution until the equivalent of 12 gm. of sulfur dioxide was in solution. The solution was then neutralized to a pH of

TABLE II

| Ex. No. | Sulfite complex | Solution concentrations Gm/l. $Cu^{2+}$ | Gm/l. $Fe^{2+}$ | Neutralizing agent | Highest pH during precipitation | Copper | Iron | Sodium | Potassium | Sulfur | Cu:Fe:Me ratio |
|---|---|---|---|---|---|---|---|---|---|---|---|
| 15 | Cu-Fe-Na | 7.5 | 15 | 20% solution $Na_2CO_3$ | 3.5 | 10.9 | 17.4 | 3.0 | | 16.2 | 3.6:5.8:1 |
| 16 | Cu-Fe-Na | 10.0 | 25 | Solid $Na_2CO_3$ | 3.5 | 10.5 | 18.8 | 3.2 | | 16.4 | 3.3:5.9:1 |
| 17 | Cu-Fe-Na | 10.0 | 25 | Solid $Na_2CO_3$ | 3.5 | 9.95 | 17.7 | 4.2 | | 15.9 | 2.4:4.2:1 |
| 18 | Cu-Fe-K | 7.5 | 15 | 20% solution $K_2CO_3$ | 2.6 | 11.0 | 12.3 | | 13.6 | | 0.8:0.9:1 |
| 19 | Cu-Fe-K | 5.0 | 10 | 20% solution $K_2CO_3$ | 3.5 | 10.8 | 13.8 | | 15.4 | 16.2 | 0.7:0.9:1 |

| Example No. | Sulfite complex | Solution concentrations Gm./l. $Cu^{2+}$ | Gm./l. $Fe^{2+}$ | Neutralizing agent | Highest pH during precipitation | Copper | Iron | Cobalt | Nickel | Magnesium | Sulfur | Cu:Fe:Me ratio |
|---|---|---|---|---|---|---|---|---|---|---|---|---|
| 20 | Cu-Fe-Mg | 5.0 | 10 | Solid $MgCO_3$ | 4.0 | 10.5 | 16.4 | | | 3.1 | | 3.4:5.3:1 |
| 21 | Cu-Fe-Mg | 5.0 | 10 | Solid $MgCO_3$ | 4.0 | 9.6 | 15.0 | | | 4.8 | 13.2 | 2.0:3.1:1 |
| 22 | Cu-Fe-Ni | 5.0 | 40 | Solid $Ni(OH)_2$ | 2.8 | 7.8 | 19.4 | | 3.6 | | 15.3 | 2.2:5.4:1 |
| 23 | Cu-Fe-Ni | 5.0 | 40 | Solid $Ni(OH)_2$ | 2.8 | 8.8 | 18.1 | | 3.2 | | | 2.8:5.7:1 |
| 24 | Cu-Fe-Co | 5.0 | 40 | Solid $Co(OH)_2$ | 3.0 | 8.1 | 18.8 | 4.0 | | | | 2.0:4.7:1 |

EXAMPLE 25

This example illustrates the preparation of a copper-iron-calcium sulfite and the use of two neutralizing agents, i.e., a carbonate and a hydroxide, in sequence.

A one liter solution containing 2.07 gm. copper and 12.2 gm. iron as sulfates was prepared. This solution had a pH of 2.5. Sulfur dioxide (10 grams) was bubbled through the solution and the pH dropped to 1.6. Ten grams of calcium carbonate was added under stirring resulting in the solution having a pH of 2.95. Six grams of calcium hydroxide was then added with stirring to neutralize the solution to a pH of 4.0. This pH value was maintained for 20 minutes and the resulting precipitated (Cu-Fe-Ca) sulfite and the co-precipitated $CaSO_4$ was filtered, washed with water, rinsed with alcohol and air dried. The complex contained 4.66 weight percent copper and 11.2 weight percent iron.

EXAMPLE 26

This example illustrates the usefulness of this invention in the recovery of metal values from sea nodules. The sea nodules contained metal values expressed in weight percent as follows:

22.5% manganese, 9.1% iron, 0.7% copper, 0.1 cobalt, and 0.4% nickel. The nodules are crushed small enough to allow suspension in water. One hundred grams of the nodules in suspension is then treated with sulphur dioxide in 1,000 mm. of water for about one hour. The undissolved materials were then filtered from the suspension. The resulting leach solution contained about 0.516 gm. copper, 8.0 gm. iron, and 22.0 gm. manganese per liter and had a pH of 1.1. The free sulphur dioxide was removed from the leach solution by suction, resulting in the leach solution having a pH of 2.7. The leach solution was then allowed to stand for about 2 hours during which the copper precipitated out as a (Cu-Fe-Mn) sulfite. Chemical analysis of the complex sulfite 10.27 weight percent copper, 13.7 weight percent iron and 15.3 weight percent manganese, a Cu:Fe:Mn weight ratio of 0.67:0.90:1. The depleted leach solution contained 5.2 mg. copper per liter. This was a 99% recovery of the copper initially present in the leach solution. It should be noted that no neutralizing agent was added to the leach solution to enhance the precipitation of the copper-iron-manganese sulfite. However, by adding a neutralizing agent to raise the pH a more rapid precipitation may be obtained.

4.0 by the addition of 11 gm. $CaCO_3$ followed by the addition of 6 gm. $Ca(OH)_2$. The pH was maintained at about 4.0 for 15 minutes, after which period the precipitated (Cu-Fe-Ca) sulfite and the co-precipitated $CaSO_4$ was separated from the solution by filtration. The dried precipitate weighed about 28.7 gm. and assayed 6.6 weight percent copper and 11.9 weight percent iron. The depleted solution contained 0.148 gm. copper per liter, corresponding to a copper recovery of 93%.

EXAMPLE 28

This example illustrates the utility of the copper-iron-manganese sulfites as a means for controlling fungus on tomato plants. The particular fungus on which this complex sulfite was effective is generally known as "tomato late bight." The copper-iron-manganese sulfite having a Cu:Fe:Mn weight ratio of 0.96:1.32:1 was ground and suspended in a liquid medium. The solution containing the suspended copper-iron-manganese sulfite was then administered to the tomato plants at several concentrations. At 500 parts per million 1% of the treated tomato plants developed the "late blight." At 100 parts per million 6% of the treated tomato plants showed "late blight." This example shows that at relatively small concentrations the copper-iron-manganese sulfites are effective in controlling tomato "late blight."

What I claim is:

1. A trimetallic sulfite complex of copper, iron and a third metal selected from the group consisting of sodium, potassium, magnesium, calcium, manganese, cobalt and nickel having a copper to iron to third metal ratio of from about 0.6:0.7:1 to about 4:6:1.

2. The composition of claim 1 wherein Me is manganese.

3. The composition of claim 2 wherein the copper: iron: manganese weight ratio is from about 0.6:0.7:1 to about 1.3:2.0:1.

4. The composition of claim 1 wherein Me is sodium.

5. The composition of claim 4 wherein the copper: iron:sodium weight ratio is from about 2:3:1 to about 4:6:1.

6. A process for preparing a complex copper-iron-metal sulfite comprising the steps of
   (1) preparing an aqueous solution containing copper ions, iron ions, and ions of a metal selected from sodium, potassium, magnesium, calcium, manganese, cobalt and nickel, (2) treating the solution with sulfur dioxide until a pH of from about 1.0 to about 2.0 is obtained, (3) neutralizing the solution to a pH of from about 2.7 to 4.0 and (4) recovering the precipitated copper-iron-metal sulfite.

7. The process of claim 6 wherein the solution is obtained by leaching copper bearing sulfide ores with a sulfuric acid solution.

8. The process of claim 6 wherein the solution is obtained by leaching sea nodules.

9. The process of claim 6 wherein the recovered copper-iron-metal sulfite has a Cu:Fe:metal ratio of from about 0.6:0.7:1 to about 4:6:1.

10. The process of claim 9 wherein the aqueous solution contains copper ions, iron ions and manganese ions.

11. A process for preparing a complex copper-iron-metal sulfite comprising the steps of:

(1) preparing an aqueous solution containing copper ions and iron ions, (2) treating the solution with sulfur dioxide until a pH of from about 1.0 to about 2.0 is obtained.

(3) neutralizing the solution to a pH of from about 2.7 to 4.0 with a compound containing a metal selected from sodium, potassium, magnesium, calcium, manganese, cobalt and nickel, and (4) recovering the precipitated copper-iron-metal sulfite.

12. The process of claim 11 wherein the recovered copper-iron-metal sulfite has a Cu:Fe:metal weight ratio of from about 0.6:0.7:1 to about 4:6:1.

References Cited

UNITED STATES PATENTS

| 1,147,466 | 7/1915 | Van Arsdale | 75—108 X |
| 1,278,854 | 9/1918 | Christensen | 23—125 X |
| 1,573,233 | 2/1926 | Eldredge | 23—125 |
| 2,280,168 | 4/1942 | Stoddard | 23—129 X |

OTHER REFERENCES

Werner, A.: New Ideas in Inorganic Chemistry, Longmans, Green & Co.; New York, 1911; pp. 117–119.

OSCAR R. VERTIZ, Primary Examiner

G. O. PETERS, Assistant Examiner

U.S. Cl. X.R.

23—315

UNITED STATES PATENT OFFICE
CERTIFICATE OF CORRECTION

Patent No. 3,515,512                                                June 2, 1970

Roald R. Skarbo

It is certified that error appears in the above identified patent and that said Letters Patent are hereby corrected as shown below:

Column 6, lines 63 and 68, "Me", each occurrence, should read -- the third metal --.

Signed and sealed this 16th day of March 1971.

(SEAL)
Attest:

Edward M. Fletcher, Jr.                              WILLIAM E. SCHUYLER, JR.
Attesting Officer                                                  Commissioner of Patents